United States Patent
Mitterreiter

(10) Patent No.: US 6,714,292 B2
(45) Date of Patent: Mar. 30, 2004

(54) POSITION MEASURING SYSTEM

(75) Inventor: Johann Mitterreiter, Chieming (DE)

(73) Assignee: Dr. Johannes Heidenham GmbH, Traurent (DE)

( * ) Notice: Subject to any disclaimer, the term of this patent is extended or adjusted under 35 U.S.C. 154(b) by 0 days.

(21) Appl. No.: 10/208,265

(22) Filed: Jul. 30, 2002

(65) Prior Publication Data
US 2003/0025903 A1 Feb. 6, 2003

(30) Foreign Application Priority Data

Jul. 30, 2001 (DE) .......................... 101 37 014

(51) Int. Cl.⁷ .................................. G01J 1/42
(52) U.S. Cl. ................ 356/218; 250/231.18; 250/559.3
(58) Field of Search ................ 356/213–229, 356/614–624; 250/231.13, 231.16, 231.14, 231.18, 559.3, 559.29, 548; 341/11, 13

(56) References Cited

U.S. PATENT DOCUMENTS

| | | | |
|---|---|---|---|
| 4,512,184 A | * 4/1985 | Ernst et al. | .......... 73/116 |
| 4,663,851 A | * 5/1987 | Feichtinger | .......... 33/1 PT |
| 4,737,635 A | * 4/1988 | Uchida | .......... 250/231.16 |
| 4,942,295 A | * 7/1990 | Brunner et al. | .......... 250/231.13 |
| 5,057,684 A | 10/1991 | Service | |
| 5,771,594 A | * 6/1998 | Feichtinger | .......... 33/1 PT |
| 6,194,710 B1 | * 2/2001 | Mitterreiter | .......... 250/231.14 |
| 6,410,910 B1 | * 6/2002 | Feichtinger | .......... 250/231.13 |
| 6,452,160 B1 | * 9/2002 | Mitterreiter | .......... 250/231.18 |
| 6,462,442 B1 | * 10/2002 | Braun et al. | .......... 310/68 B |

* cited by examiner

Primary Examiner—Frank G. Font
Assistant Examiner—Sang H. Nguyen
(74) Attorney, Agent, or Firm—Brinks Hofer Gilson & Lione

(57) ABSTRACT

A position measuring system that includes a graduation support having a first detent and a detector arrangement on a holder for scanning the graduation support at a preset scanning distance. An adjusting device that sets the preset scanning distance, the adjusting device is displaceable relative to the holder along a first direction from a mounting position to an operating position. The adjusting device includes a second detent which, in the mounting position, acts together with the first detent of said graduation support acting in the first direction, and the first and second detents are out of engagement at the operating position and a receiver which, at the mounting position, maintains the graduation support oriented perpendicularly with respect to the first direction, and the receiver is removed from the graduation support by being displaced in the first direction. A coupling element that couples the adjusting device free of play with the holder at least in a second direction perpendicular with respect to the first direction.

9 Claims, 4 Drawing Sheets

POSITION MEASURING SYSTEM

Applicant claims, under 35 U.S.C. § 119, the benefit of priority of the filing date of Jul. 30, 2001 of a German patent application, copy attached, Serial Number 101 37 014.8, filed on the aforementioned date, the entire contents of which is incorporated herein by reference.

BACKGROUND OF THE INVENTION

1. Field of the Invention

The present invention relates to a position measuring system, having a graduation support, a detector arrangement, adjusting device for setting a scanning distance, and a coupling element.

2. Discussion of Related Art

A position measuring system basically includes a graduation support and a detector arrangement for scanning the graduation on the graduation support. Here, the detector arrangement generates position-dependent scanning signals. The quality of these scanning signals is a function of the distance between the graduation support and the detector arrangement. In connection with measuring steps required these days, a graduation period of the graduation of a few micrometers is required. The smaller the graduation period, the more accurately must a preset scanning distance, which is a function of the scanning principles, be adjusted.

So-called modularly constructed position measuring systems are becoming more and more successful for reasons of cost and space-saving installation. With a modularly constructed position measuring system, the position measuring system does not have its own seating, or guidance, for the graduation support, therefore the relation between the detector arrangement and the graduation support is not preset and must be adjusted by an adjusting device in the course of the installation on the objects to be measured. Modularly constructed angle measuring systems without an associated seating are also called modular encoders.

A position measuring system in the form of an angle-measuring system is known from U.S. Pat. No. 5,057,684, the entire contents of which are incorporated herein by reference. An adjusting device can be displaced by a hoop-shaped actuating member in the direction of the scanning distance, i.e. axially from a mounting position into an operating position, for setting the scanning distance. This displacement takes place in a recess of the holder of the detector arrangement. In actuality the holder and the adjusting device axially displaceable therein are mostly made of plastic. It has been found that for manufacturing reasons the adjusting device has a relatively large play in the recess of the holder. Because of this play, the radial relation between the graduation support and the detector arrangement remains undefined during mounting. The radial distance of the graduation from the detector arrangement has a tolerance as a function of the play. With the continuing increase of miniaturization, the radial width of the graduation, as well as of the detector element, is relatively small. In many cases there are several graduation tracks arranged next to each other on the graduation support. For scanning, the detector arrangement has detector elements which are also arranged next to each other. Too great a radial play between the adjusting device and the holder can result in the required relation between the graduation and the detector element not being achieved.

OBJECT AND SUMMARY OF THE INVENTION

It is therefore an object of the present invention to disclose a position measuring system wherein the adjusting device better assures the correct position relation between the graduation and the detector arrangement.

This object is attained by a position measuring system that includes a graduation support having a first detent and a detector arrangement on a holder for scanning the graduation support at a preset scanning distance. An adjusting device that sets the preset scanning distance, the adjusting device is displaceable relative to the holder along a first direction from a mounting position to an operating position. The adjusting device includes a second detent which, in the mounting position, acts together with the first detent of said graduation support acting in the first direction, and the first and second detents are out of engagement at the operating position and a receiver which, at the mounting position, maintains the graduation support oriented perpendicularly with respect to the first direction, and the receiver is removed from the graduation support by being displaced in the first direction. A coupling element that couples the adjusting device free of play with the holder at least in a second direction perpendicular with respect to the first direction.

An advantage of this position measuring system in accordance with the present invention lies in that the correct position relation between the graduation and the detector element is assured without any great technical manufacturing outlay. The guidance of the adjusting device is free of play, at least in the required direction which sets the distance between the graduation and the detector arrangement (perpendicularly in relation to the scanning distance).

Exemplary embodiments of the present invention will be explained in greater detail by the drawings.

DETAILED DESCRIPTION OF THE PREFERRED EMBODIMENTS

Figure 3:
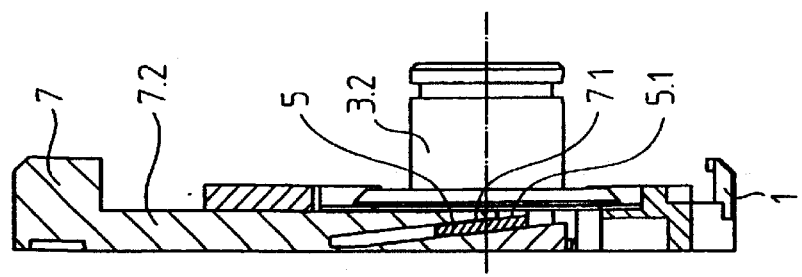
FIG. 3 is a cross-sectional view along the line III—III of the angle measuring system in accordance with FIG. 1.

A first exemplary embodiment of the present invention in the form of an angle measuring system is represented in FIGS. 1 to 6. The basic structure of this angle measuring system corresponds to the angle measuring system in accordance with U.S. Pat. No. 5,057,684, the entire contents of which are incorporated herein by reference. This angle measuring system is laid out for being attached to a drive unit, in particular an electric motor. In the installed state the rotation of the motor shaft with respect to the stationary part of the motor is measured.

For this purpose the angle measuring system consists of a holder 1 with a detector arrangement 2. A graduation support 3 with a graduation 4 is arranged opposite the detector arrangement 2. The graduation support 3 includes a disk 3.1 and a hub 3.2.

According to the present invention, steps are taken to make the attachment of the angle measuring system to the motor easier for the user. In particular, an adjustment device 5 is arranged in a recess 6 of the holder 1. The adjustment device 5 has lateral guidance slopes 5.1, which act together with corresponding guidance slopes 7.1 of an actuating device 7. The actuating device 7 is designed in a hoop shape and has two legs 7.2, which can be radially pushed into corresponding fittings of the holder 1. In the course of being pushed in, the guidance slopes 7.1 of the legs 7.2 come into contact with the guidance slopes 5.1 of the adjusting device 5 and maintain the latter in the holder 1. In the process, the legs 7.2 are axially supported in the holder 1, on the one hand and, on the other, act together with the adjusting device 5 for the axial fixation of the latter.

Figure 2:
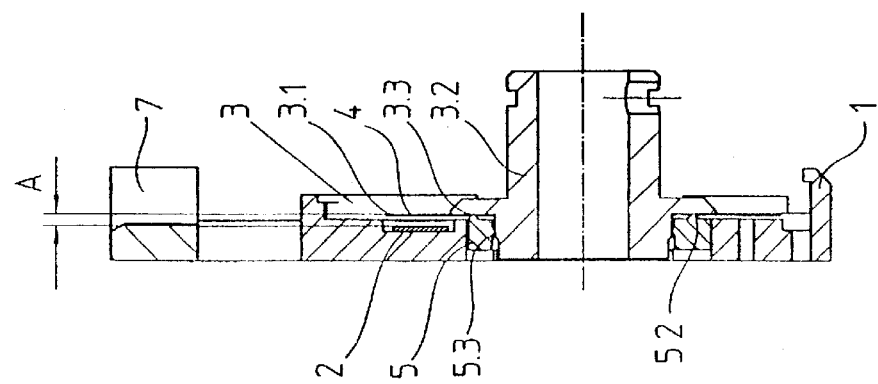
FIG. 2 is a side cross-sectional view along the line II—II of the angle measuring system in accordance with FIG. 1.
Figure 1:
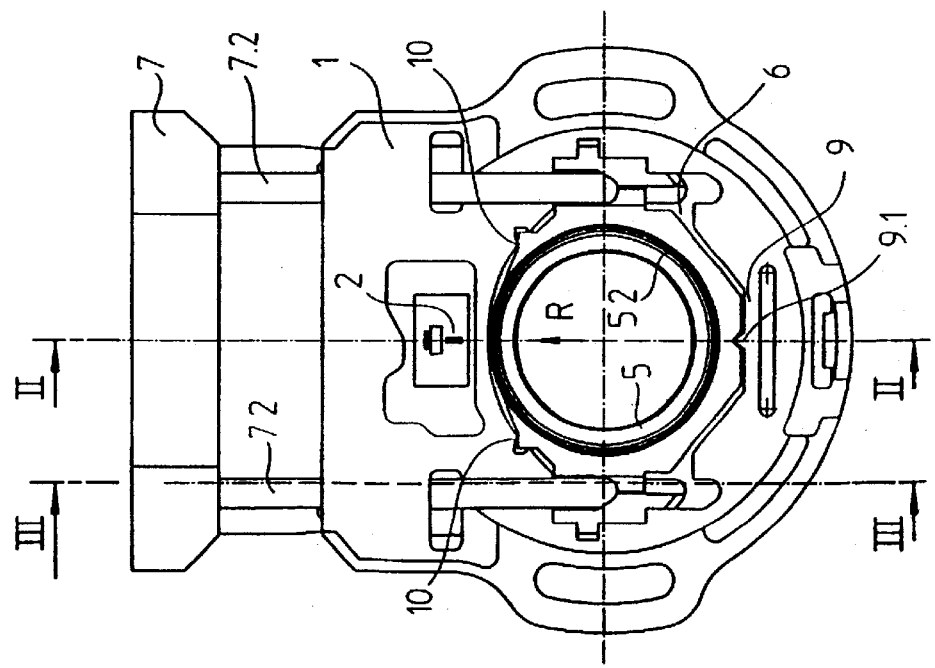
FIG. 1 is a top view of an embodiment of an angle measuring system according to the present invention in the mounting position.

A position of the actuating device 7 is represented in FIGS. 1 to 3, in which the scanning distance A (the axial distance between the graduation 4 and the detector element of the detector arrangement 2 which scans it) is definitely set by the cooperation between detents 5.2 of the adjusting device 5 and detents 3.3 of the graduation support 3. This radial position of the actuating device 7 is advantageously fixed by a catch in the holder 1. In this position the holder 1 is connected in a torsion-proof manner with the stationary portion of the motor, and the hub 3.2 is connected in a torsion-proof manner with the shaft of the motor. In this case the hub 3.2 is axially pressed against the adjustment device 5.

The radial position relation between the graduation 4 and the detector arrangement 2 is preset by the adjusting device 5, wherein on the one hand the latter has a receiver 5.3, in which the graduation support 3 is radially fixed in place in the mounted position and, on the other hand, is coupled, free of play, with the holder 1 in the radial direction R, i.e. extending in the direction toward the detector arrangement 2 perpendicularly with respect to the scanning distance. In the first exemplary embodiment this coupling is provided by a pressure element 9, which urges the adjusting device 5 against one or several guide faces 10 of the holder 1. For example, the pressure element is a spring element in the form of an elastic strip 9, formed in one piece on the holder 1, which exerts a pressure force on the adjusting device 5 in the direction R. The play-free coupling between the adjusting device 5 and the holder 1 is therefore assured by a frictional connection in this direction R.

As represented in FIG. 1, it is advantageous if the strip 9 has a protrusion 9.1 and is in a point contact or, in the axial direction in a line contact, with the adjusting device 5, and the guide faces 10 of the holder 1 are also embodied as protrusions. By this a definite assignment of the adjusting device 5, and therefore of the disk 3.1 radially fixed therein, is assured. The required tolerances can be easily maintained during manufacture, since only the guide faces 10 must have a definitely set distance from the detector arrangement 2 in the direction R in the recess 6 of the holder 1.

Figure 6:
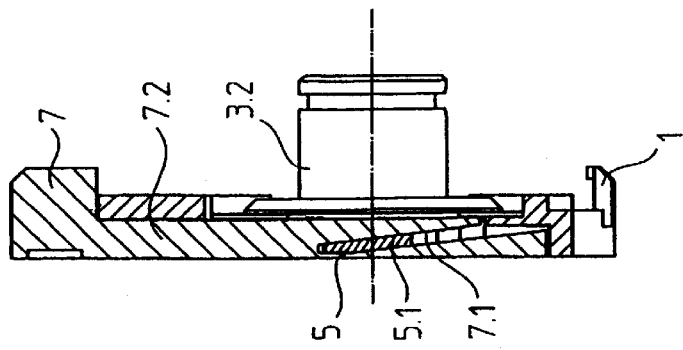
FIG. 6 is a side cross-sectional view along the line VI—VI of the angle measuring system in accordance with FIG. 4.
Figure 5:
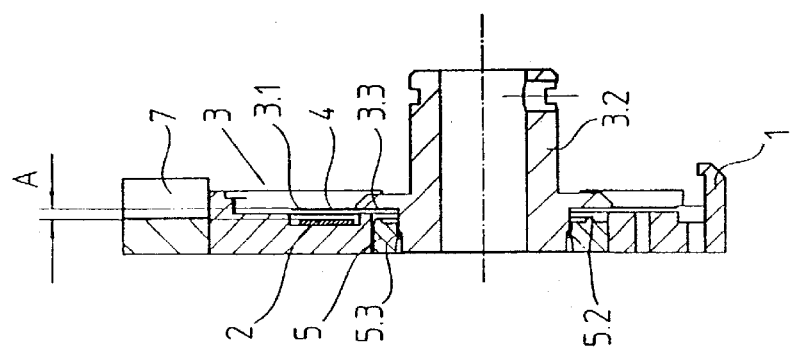
FIG. 5 is a side cross-sectional view along the line V—V of the angle measuring system in accordance with FIG. 4.
Figure 4:
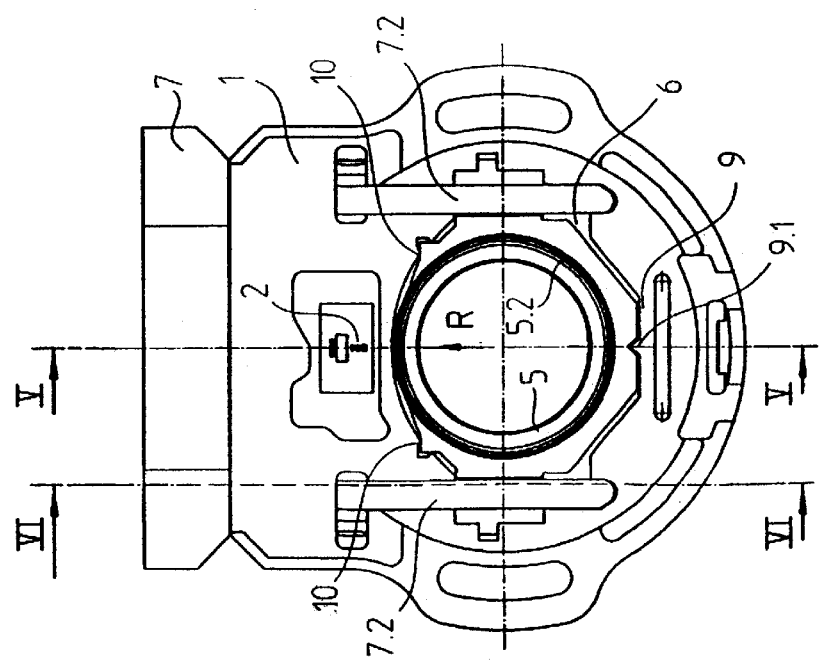
FIG. 4 is a top view of the angle measuring system in accordance with FIG. 1 in the operating position.

After the holder 1 has been connected in a torsion-proof manner with the stationary portion of the motor, and the hub 3.2 in a torsion-proof manner with the shaft of the motor in the relationship represented in FIGS. 1 to 3, the adjusting device 5 is axially displaced. This axial displacement is initiated by the actuating device 7, in that the legs 7.2 are pushed radially farther into the holder 1 and, by the cooperation of the guidance slopes 5.1 of the adjusting device 5 and the guidance slopes 7.1 of the actuating device 7, this radial movement is converted into a stepped-down displacement movement of the adjusting device 5. The legs 7.2 are axially supported on the holder 1 and during the radial movement also fix the adjusting device 5 axially in a position set by the guidance slopes 5.1, 7.1. In the course of this the axially acting detents 5.2 of the adjusting device 5 move away from the detents 3.3 of the graduation support 3. The radially acting receiver 5.3 of the adjusting device 5 also comes out of engagement with the circumferential surface of the hub 3.2 by being located opposite a circumferential surface of lesser cross section. The angle measuring system is ready to operate in this position of the adjusting device. This relationship is advantageously preset by a catch, or by detents between the actuating element 7 and the holder 1. This operating position of the angle measuring system is represented in FIGS. 4 to 6.

Figure 7:
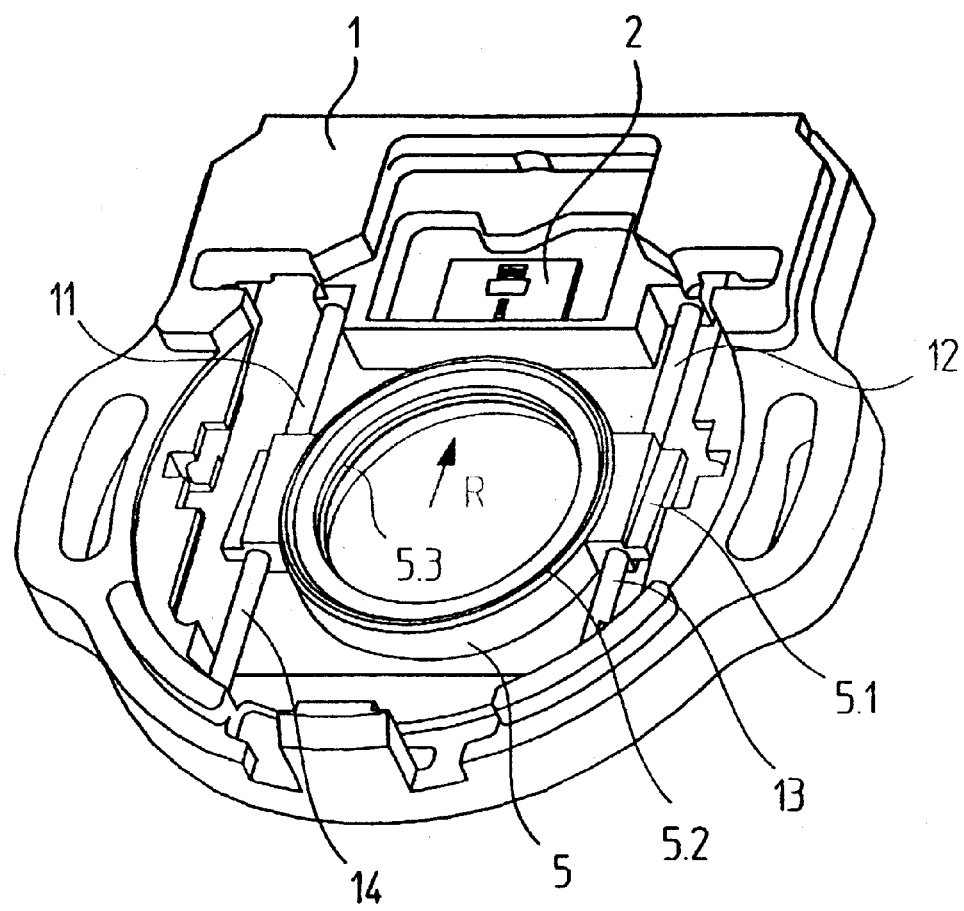
FIG. 7 is a plan view of a second embodiment of an angle measuring system according to the present invention.

A second exemplary embodiment of the invention will be described by FIG. 7. The basic structure of this angle measuring system corresponds to the embodiment in accordance with FIGS. 1 to 6, so that only differences will be explained in what follows. The actuating element 7 is not represented for reasons of clarity.

To achieve a coupling free of play of the adjusting device 5 with the holder 1 in the radial direction R (in the direction toward the detector arrangement), the adjusting device 5 is hinged on the holder 1 by at least one connecting strip 11 to 14, which is rigid in the direction R and deflectable in the direction of the scanning distance A. In accordance with the exemplary embodiment represented, four connecting strips, 11, 12, 13, 14 extending parallel with each other and in the radial direction R are connected at respectively one of their ends with the holder 1, and with their other ends with the adjusting device 5. The deflectable connecting strips 11 to 14 assure a guidance free of play of the adjusting device 5 in the axial direction. If, because of the combined action of the guidance slopes 5.1 and 7.1, the adjusting device 5 is displaced in the axial direction, the connecting strips 11 to 14 are bent, or possibly stretched between their fastening points because of their rigid connection in the direction R with the holder 1 on the one hand and, on the other with the adjusting device 5.

Advantageously the connecting strips 11 to 14 are formed as plastic elements in one piece with the holder 1 and the adjusting device 5.

Figure 8:
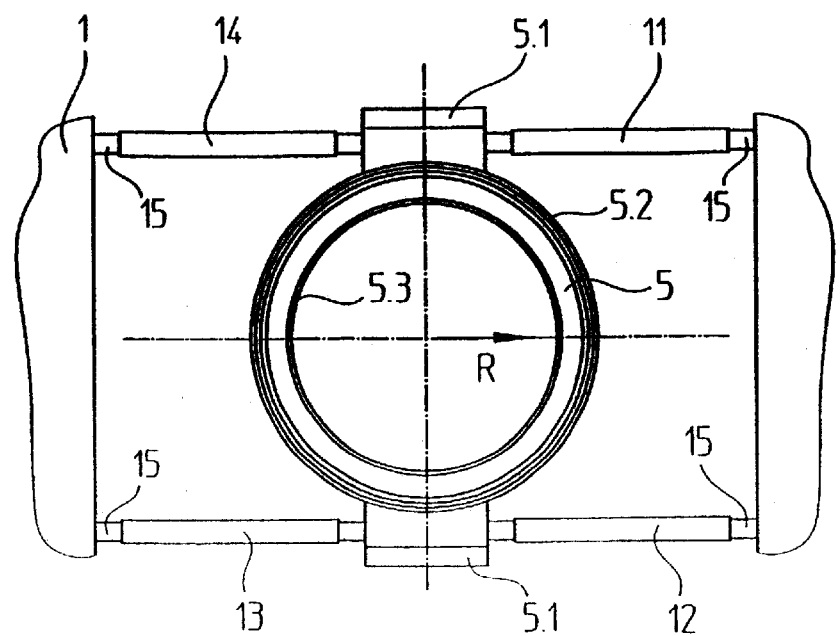
FIG. 8 is a partial view of a third embodiment of an angle measuring system according to the present invention.
Figure 9:
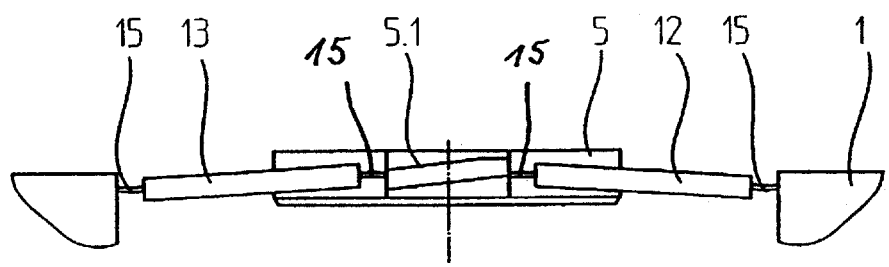
FIG. 9 is a lateral view of the angle measuring system in accordance with FIG. 8 in the mounting position.
Figure 10:
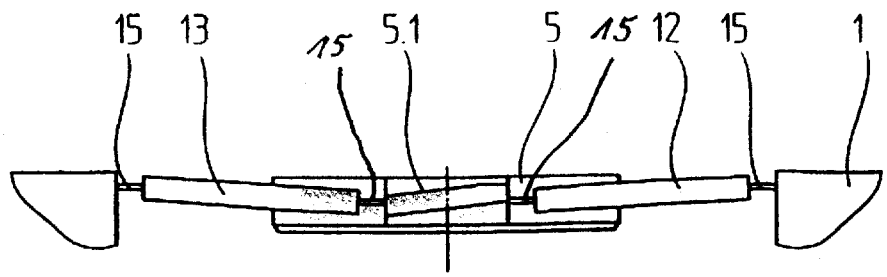
FIG. 10 is a lateral view of the angle measuring system in accordance with FIG. 8 in the operating position.

Connecting strips 11 to 14 as coupling elements between the adjusting device 5 and the holder 1 are also arranged in the third exemplary embodiment of the present invention in accordance with FIGS. 8 to 10. In contrast to the previous example, the length of the connecting strips 11 to 14 is selected to be such that a first position of rest occurs in the deflected state in accordance with FIG. 9 as the mounting position and, after applying a buckling force, a second rest position in the deflected state in accordance with FIG. 10 as the operating position. To make definite buckling easier, joints 15 are formed at the fastening points.

The present invention can be particularly advantageously employed with an angle measuring system with a disk-shaped graduation support 3. In this case the direction R, in which the adjusting device 5 is to be coupled free of play with the holder 1, extends perpendicularly with respect to the scanning distance A, and perpendicularly from the detector arrangement 2 to the axis of rotation of the graduation support 3. But the present invention can also be successfully employed with linear measuring systems. There, the direction R, in which the adjusting device 5 is to be coupled free of play with the holder 1, extends perpendicularly with respect to the scanning distance A and, starting at the detector arrangement 2, perpendicularly to the measuring direction. Here, the axial direction extends in the direction of the scanning distance, i.e. perpendicularly to the graduation-bearing surface to be scanned.

The graduation 4 is an incremental, or an absolute one- or multi-track coding, which can be scanned optoelectrically, capacitively, inductively or magnetically.

Within the scope of the present invention, further embodiment variations of course also exist besides the explained example.

I claim:

1. A position measuring system, comprising:
   a graduation support comprising a first detent;
   a detector arrangement on a holder for scanning a graduation of said graduation support at a preset scanning distance;
   an adjusting device that sets said preset scanning distance, said adjusting device is displaceable relative to said holder along a first direction, from which said preset scanning distance is measured, and from a mounting position to an operating position, wherein said adjusting device comprises:
      a second detent which, in said mounting position, acts together with said first detent of said graduation support acting in said first direction, and said first and second detents are out of engagement at said operating position, and
      a receiver which, at said mounting position, maintains said graduation support oriented perpendicularly with respect to said first direction, and said receiver is removed from said graduation support by being displaced in said first direction;
   a coupling element that couples said adjusting device free of play with said holder at least in a second direction perpendicular with respect to said first direction.

2. The position measuring system in accordance with claim 1, wherein said coupling element comprises a pressure element that urges said adjusting device against a guide face of said holder in said second direction.

3. The position measuring system in accordance with claim 2, wherein said pressure element comprises a spring element, which is embodied in one piece with said holder.

4. The position measuring system in accordance with claim 1, wherein said coupling element comprises a connecting strip between said adjusting device and said holder, which is deflected in said first direction and which fixes said adjusting device in place in said second direction.

5. The position measuring system in accordance with claim 4, wherein said adjusting device is connected with said holder by said connecting strip, which extends perpendicular to said first direction and are rigid in said second direction.

6. The position measuring system in accordance with claim 5, wherein said adjusting device is arranged in a recess of said holder, wherein a first end of said connecting strip is fastened on said holder in an area of said detector arrangement, and a second end of said connecting strip is fastened on said adjusting device, and a second connecting strip is fastened diametrically opposite said connecting strip, wherein said second connecting strip comprises a first end fastened on said holder and a second end fastened on said adjusting device.

7. The position measuring system in accordance with claim 6, wherein said connecting strip at said mounting position and at said operating position and said second connecting strip are buckled in said first direction with respectively one of their positions of rest.

8. The position measuring system in accordance with claim 5, wherein said connecting strip at said mounting position and at said operating position is buckled in said first direction with respectively one of its positions of rest.

9. The position measuring system in accordance with claim 1, wherein said adjusting device is axially displaced by an actuating element in that a movement of said actuating element is converted into a movement of said adjusting device via guidance slopes.

* * * * *

UNITED STATES PATENT AND TRADEMARK OFFICE
CERTIFICATE OF CORRECTION

PATENT NO. : 6,714,292 B2  
DATED : March 30, 2004  
INVENTOR(S) : Johann Mitterreiter It is certified that error appears in the above-identified patent and that said Letters Patent is hereby corrected as shown below:

<u>Title page,</u>  
Item [73], Assignee, delete "Heidenham" and substitute -- Heidenhain -- in its place.

Signed and Sealed this

Nineteenth Day of April, 2005

JON W. DUDAS  
*Director of the United States Patent and Trademark Office*